June 28, 1955 — D. H. QUINN — 2,711,994
GRAVITY FLOW STERILIZING FILTERS
Filed May 26, 1950

INVENTOR.
David H. Quinn

United States Patent Office 2,711,994
Patented June 28, 1955

2,711,994

GRAVITY FLOW STERILIZING FILTERS

David H. Quinn, Brookline, Mass., assignor to Quinn Products, Inc., Boston, Mass., a corporation of Massachusetts Application May 26, 1950, Serial No. 164,482

2 Claims. (Cl. 210—16)

This invention relates to a pocket-size, quarter-pound water filter designed to operate under the hydrostatic pressure of a column of water two or more feet high. Sufficient water pressure is thus developed to clarify and sterilize polluted water at the flow rate of 5 minutes per quart.

It is intended primarily for emergency use and, because of its insignificant size and weight, provides both military men and civilians a cheap insurance against the attrition of, or separation from, central water supplies.

Experience in World War II showed clearly that there is no substitute for filtration. Even a powerful and nauseating dose of chemicals, agitated in a canteen for the prescribed 20 minutes, cannot be depended upon with certainty to kill all the amoebae and the cysts of amoebae and other parasites. These organisms, and the less hardy bacteria, often become so imbedded in particulate matter in suspension in the water as to become partially protected from the effects of the chemicals.

This filter physically and completely removes all parasites and their cysts from the influent water and thus eliminates the principal hazard in the purification of drinking water in the field, and the most difficult problem in treating water chemically. Most of the bacterial organisms are also physically removed, the small residual which do come through the filter media being immediately killed off by intimate contact with the bactericide with which it is impregnated.

To develop a bactericide suitable for this application, much work was done with the colloidal dispersion of the heavy metals. It was shown that such colloids have inconsistent bactericidal characteristics, probably due to the somewhat unpredictable conglomeration of the colloidal particles caused by changes in the pH of the raw water. For the purposes of this invention it has been found that the silver salts of very low solubility provide the most dependable, long-lived and non-toxic bactericidal effect, particularly silver chloride.

A regulated hydrostatic pressure, achieved through the height of the water column, is important to the type of paper and asbestos filter media which has been shown to be best suited to this application, as particles of a size normally held back may be forced through the filter by using an excessive pressure. Such pressures could be obtained with this device by rolling and squeezing the water bag.

The optimum rate of flow, which provides adequate contact time of the water and the bactericide impregnated fibers of the filter, is about 1 quart in 5 minutes. Initially, the surface of the water in the bag should be not over 2 feet above the filter. As the filter disk clogs more pressure is required to maintain this rate and this is obtained by positioning the water bag slightly higher with each succeeding quart until it is directly above the filter, the position of maximum pressure. The asbestos fibers are positively charged and attract and hold the negatively charged bacteria. If the water pressure is too great this hold is broken.

On the way through the filter media the water picks up a concentration of silver ions sufficient to exert a continued bactericidal effect. As the solubility of silver chloride is only about 1½ milligrams per liter it is quite impossible for the silver ions in the water to exceed approximately one part per million, which is so far below the range of human toxicity that years of constant daily use of this water could produce no measurable or cumulative physiological effect. Nevertheless, with the cysts of *E. histolytica* removed by filtration, this concentration in the filtrate is sufficient to eliminate any need for further chemical treatment.

This filter assembly is used to the best advantage with the inventor's flexible, plastic, cloth-covered canteen, which comprises a sterilizing closure cap that effectively inhibits bacteria growth in the canteen contents. When these two inventions are used in cooperation the danger of contamination of the contents is eliminated.

The objects of this invention are, first, to provide a light weight, complete filter assembly which will pack compactly by folding the water bag and its tube tightly around the filter housing, and which comprises a filter media which may be impregnated with a bactericide, and which will clarify and sterilize field water under hydrostatic pressure; second, to provide a simple and rugged filter housing which will permit quick replacement of the expendable filter disks without the use of tools; and, third, to provide a means of firmly attaching the filter housing to the threaded nozzle of the regulation military canteen in such a way that the danger of accidental contamination of the filtrated and purified water is reduced to a minimum.

Other objects will become apparent as the description proceeds in connection with the annexed drawings, which are confined to only one basic design involving but a single filtration disk. A variation of the design shown would permit the simultaneous use of two or more filtration disks. The influent port in such a case could be either at the periphery of the filter housing, which would produce different drip characteristics for accidentally spilled raw water, or at the center as shown. The use of two filtration disks would double the rate of flow from the filter housing, and double the volume of water purified before it became necessary to replace the clogged disks, but would not in any way violate the scope of this invention, as hereinafter described.

Figure 1:
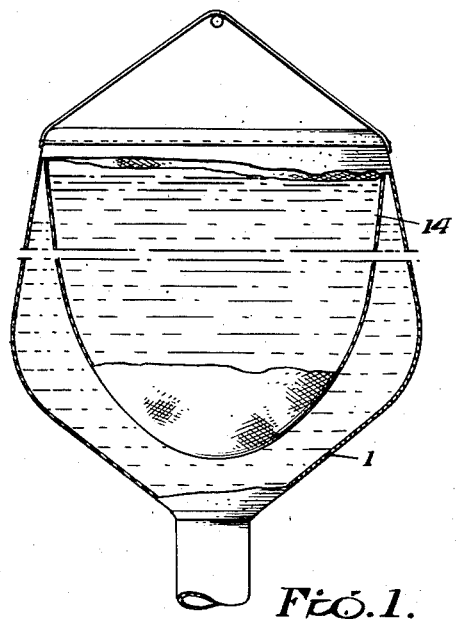
Fig. 1 is a vertical, longitudinal sectional view of the filter assembly, with side elevation of the raw water container, and its tube to provide hydrostatic pressure, and with the filter housing fixed in operating position on the nozzle of a regulation military canteen.

As shown in Fig. 1, the filter assembly comprises a flexible container 1 for the unfiltered water, a length of tubing 2 attached to the container and the filter housing and of sufficient length to provide adequate filtering pressure, a filter housing for example, of polystyrene, in two sections, 3 and 4, which are connected by a screw thread 13, a standard canteen nozzle 5 which screws into the threaded bore 12, a filter disk 6, preferably bactericidally impregnated, which is sealed at its periphery by the screw pressure of the two halves of the housing and the two annular ridges 7 in contact with the disk, two separating disks 8, which may be of screening material, to provide lateral circulation over both faces of the filter disk, a rubberous O ring 9 to prevent wick action seepage through the periphery of the filter disk, an annular series of small influent ports 10, and an annular series of small effluent ports 11. The bag 14 which is inserted in the water container 1 is made of permeable material, which is preferably impregnated with a bactericide, filters out the algae and larger particles from the water and may be permanently attached to the water container 1 or made detachable.

Figure 2:
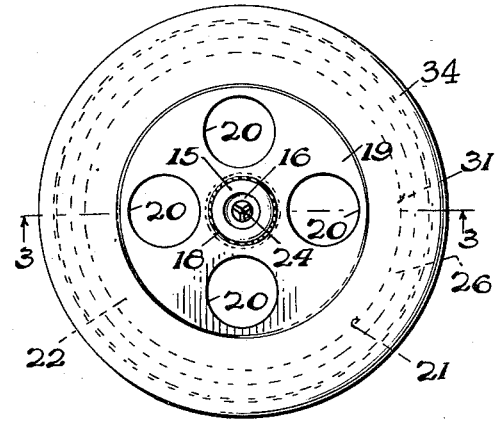
Fig. 2 is an enlarged top plan view of a filter housing which is equipped with a mechanical means of sealing the hydrostatic tube to the influent port of the filter housing.

As shown in Fig. 2 the top plan view of this filter housing is equipped with a mechanical means of sealing the hydrostatic tube to the filter housing and has other slight variations from the design of Fig. 1. The top half 34 of the filter housing comprises an annular groove which is threaded on its outside diameter to engage with the threads of a disk 19 containing four finger holes 20, and which has a center hole with a slight downward and outward taper to encircle the influent nozzle 15 and to sealingly compress the lower periphery of the hydrostatic tube 18 against said nozzle which contains a counterbore 16 above and concentric with the influent port 17. The outside diameter of the filter disk is shown by the dotted line 21.

Figure 3:
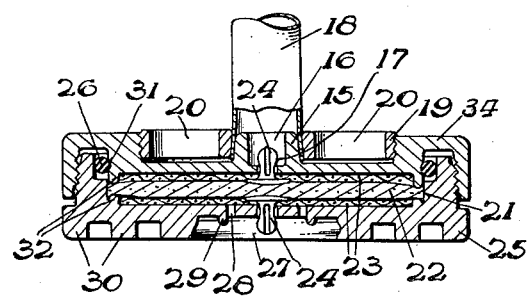
Fig. 3 is a vertical, longitudinal sectional view which details the top plan view of the filter of Fig. 2 on lines 3—3 of Fig. 2.

Fig. 3 is a sectional view on the lines 3—3 of Fig. 2 to more clearly show the details of construction. The top half of the filter housing 34 threadingly engages with the lower half 25 and is sealed against wick action seepage through the periphery of the filter disk by a rubberous O ring 26, which is semi-permanently positioned in groove 31. The peripheries of both halves of the filter housing, 34 and 25, are heavily knurled to facilitate the hand compression of the annular ridges 32 against the periphery of the filter disk 22 and thus prevents the raw water from by-passing the filter media.

Lateral circulation of water over top and bottom surfaces of the filtration disk 22 is insured by separation disks 23, which may be of screening material, and are swiveled to each part of the housing by bull headed buttons 24 which pass through loose fitting holes in the separation disks and press fit into the influent and effluent ports. It is important that these separation disks be semi-permanently attached to the filter housing to avoid accidental loss when the filter disk is changed in the field, and provision must likewise be made for them to turn freely to avoid abrading the filter disk as it is tightened into operating position.

In the bottom part 25 is a counterbore 27 which is threaded to fit the standard military canteen nozzle and hold it tightly against the filter housing with one turn or less. Supplementing the central effluent port through which the button 24 passes is an annular series of small holes 28, immediately outside of which is a drip ring 29 which serves to keep the filtrated water from dripping over the outside of the canteen nozzle. The ridges 30 are also designed to prevent vagrant drops of raw water from reaching the center of the housing and coming in contact with the canteen nozzle.

When the bottom part of the filter housing 25 and the top part 34 are made of transparent plastic it is possible to see the operation of the filtration disk 22 and to be sure that it is properly seated in the housing. The filter disk 22 impregnated with a silver salt of low solubility such as silver chloride may be permeated with an adsorptive agent such as fine granules of activated carbon or with granules of anion or cation resins, or, these agents may be retained as a layer between two layers of the filtration media, to remove color, odor, taste, salts and toxins in solution in the water.

What is claimed is:

1. A portable filter comprising a flexible liquid container having an inlet opening and an outlet opening at opposite ends thereof, a permeable bag filter to filter out algae and larger particles in said flexible liquid container between the inlet and outlet, a separable filter casing having inlet and outlet openings, a dense fibrous filter pad, said filter pad impregnated with a bactericide of low solubility and positioned between the separable parts of said filter casing, and a flexible elongated conduit connecting the outlet opening of said flexible container and the inlet opening of said separable casing to provide a variable hydraulic head on the filter pad positioned between the separable parts of said filter casing.

2. The invention defined in claim 1 wherein the filter pad positioned between the separable parts of said casing is impregnated with silver chloride.

References Cited in the file of this patent

UNITED STATES PATENTS

| Number | Name | Date |
|---|---|---|
| 271,293 | Woodward | Jan. 30, 1883 |
| 293,519 | Rich | Feb. 12, 1884 |
| 500,094 | Bennett | June 20, 1893 |
| 636,489 | Clarke | Nov. 7, 1899 |
| 890,989 | Knight | June 16, 1908 |
| 1,205,743 | Hoke | Nov. 21, 1916 |
| 1,473,331 | Bechhold | Nov. 6, 1923 |
| 1,475,577 | Green | Nov. 27, 1923 |
| 1,557,234 | Bechhold | Oct. 13, 1925 |
| 1,642,089 | Schreier | Sept. 13, 1927 |
| 1,988,246 | Krause | Jan. 15, 1935 |
| 1,993,761 | Tippins | Mar. 12, 1935 |
| 2,144,781 | Seitz | Jan. 24, 1939 |
| 2,167,225 | Van Eweyk | July 25, 1939 |
| 2,280,480 | Cox | Apr. 21, 1942 |
| 2,368,035 | Moore | Jan. 23, 1945 |
| 2,389,185 | Dick | Nov. 20, 1945 |
| 2,456,524 | Meincke, Jr. | Dec. 14, 1948 |
| 2,463,327 | Snell et al. | Mar. 1, 1949 |

FOREIGN PATENTS

| Number | Country | Date |
|---|---|---|
| 590,267 | Great Britain | July 11, 1947 |
| 479,062 | France | Feb. 9, 1916 |
| 19,172 | Great Britain | Aug. 26, 1911 |
| 384,547 | Great Britain | Dec. 8, 1932 |